United States Patent [19]

Kausch et al.

[11] Patent Number: 4,877,825
[45] Date of Patent: Oct. 31, 1989

[54] ELASTHANE FIBERS STABILIZED AGAINST ENVIRONMENTAL INFLUENCES

[75] Inventors: Michael Kausch, Cologne; Hans-Josef Buysch, Krefeld; Hans Schröer, Dormagen; Carlhans Süling, Odenthal, all of Fed. Rep. of Germany

[73] Assignee: Bayer Akteingesellschaft, Leverkusen, Fed. Rep. of Germany

[21] Appl. No.: 323,042

[22] Filed: Mar. 10, 1989

Related U.S. Application Data

[63] Continuation of Ser. No. 111,859, Oct. 23, 1987, abandoned.

[30] Foreign Application Priority Data

Nov. 4, 1986 [DE] Fed. Rep. of Germany ....... 3637509

[51] Int. Cl.$^4$ ............................ C08K 5/34; C08K 5/53
[52] U.S. Cl. ...................................... 524/101; 524/120
[58] Field of Search ................................. 524/101, 120

[56] References Cited

U.S. PATENT DOCUMENTS

| | | | |
|---|---|---|---|
| Re. 30,946 | 5/1982 | Hoffman et al. ..................... | 524/120 |
| 3,053,878 | 9/1962 | Friedman et al. ................... | 524/120 |
| 3,386,942 | 6/1968 | Bell ..................................... | 524/120 |
| 3,573,251 | 3/1971 | Megna ................................. | 524/120 |
| 4,025,486 | 5/1977 | Gilles ................................... | 524/120 |
| 4,584,146 | 4/1986 | Chaser ................................. | 524/101 |

FOREIGN PATENT DOCUMENTS 0137408 4/1985 European Pat. Off. .
1912179 10/1969 Fed. Rep. of Germany .

*Primary Examiner*—John Kight
*Assistant Examiner*—Kriellion Morgan
*Attorney, Agent, or Firm*—Connolly & Hutz

[57] ABSTRACT

The invention relates to elasthane fibers which are protected against harmful environmental influences, particularly sunlight and combustion gases, by a synergistic stabilizer combination of (a) highly alkylated, phenolic antioxidants corresponding to the following formula

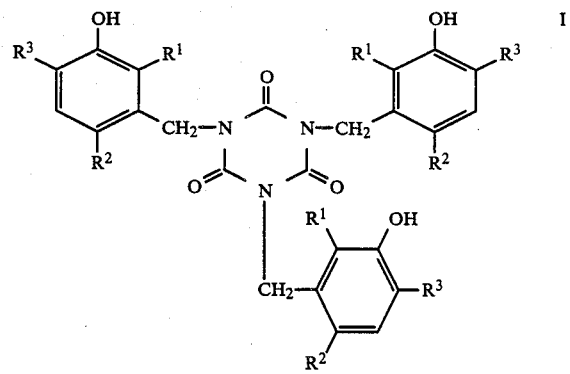

in which $R^1$, $R^2$ and $R^3$ are $C_1$–$C_3$ alkyl radicals, in addition to which $R^3$ may be $C_4$–$C_6$ alkyl radicals and (b) oligomeric, (cyclo)aliphatic phosphorous acid esters (oligomeric phosphites) obtained by reaction of pentaerythritol, perhydrobisphenol A and, optionally, a mono- alcohol with monomeric trialkyl or triaryl phosphites.

9 Claims, No Drawings

ELASTHANE FIBERS STABILIZED AGAINST ENVIRONMENTAL INFLUENCES

This application is a continuation of application Ser. No. 111,859, filed 10/23/87, abandoned.

This invention relates to elasthane fibers stabilized against harmful environmental influences, more especially sunlight and combustion gases, by a synergistic stabilizer combination of (a) highly alkylated phenolic antioxidants corresponding to the following formula

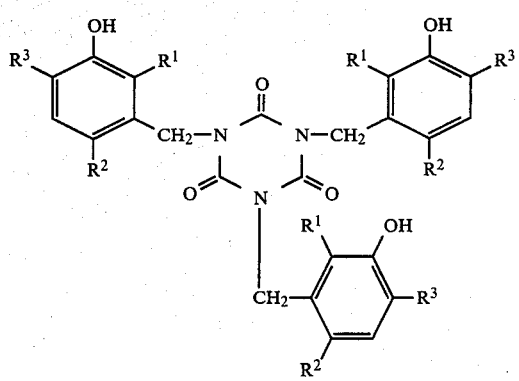

in which
$R^1$, $R^2$ and $R^3$ are $C_1-C_3$ alkyl radicals, in addition to which $R^3$ may be $C_4-C_6$ alkyl radicals
and
(b) oligomeric, (cyclo)aliphatic phosphorous acid esters (oligomeric phosphites) obtained by reaction of pentaerythritol, perhydrobisphenol A and, optionally, a monoalcohol with monomeric trialkyl or triarylphosphites.

Elasthane filaments are filaments of which at least 85% by weight consist of segmented polyurethanes. The elastic and mechanical properties are achieved by using polyurea polyurethanes of aromatic diisocyanates. Elasthane filaments are produced by wet spinning or dry spinning of solutions. Suitable solvents are polar solvents, for example dimethylsulfoxide, N-methylpyrrolidone and, preferably, dimethylformamide or dimethylacetamide. Elasthanes have to be stabilized against light and harmful gases and, for this reason, contain stabilizers which are either introduced into the spinning solution as an additive or are incorporated in the segmented polyurethane. Where additives are used, they should not be volatile under the spinning conditions.

Various stabilizers and stabilizer combinations of phenolic antioxidants and phosphites have already been proposed with a view to improving the stability of elasthanes.

However, the stabilities of these described elasthane filaments do not satisfy current technical requirements because, on the one hand, the stabilizing compounds used must not adversely affect the mechanical and elastic properties while, on the other hand, none of the processing steps from production of the filaments to the finished article, such as corsetry or bathing apparel, should reduce the effectiveness of the stabilizer systems used.

According to Jap. P.S. 56-107009, a phenolic antioxidant corresponding to the following formula

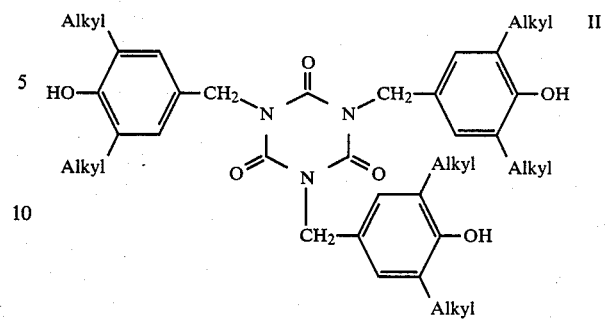

is added to the elasthane solution, the fibers only being treated after spinning with an oil containing a monomeric aromatic or aliphatic phosphite. This is an extremely unreliable method of stabilization, because both the application and the adhesion of the phosphites to the surface are susceptible to various adverse influences.

US-A 3 386 942 describes stabilizer combinations of p-cresols substituted in the 2,6-position by long-chain aliphatic radicals and phosphites corresponding to the following formulae

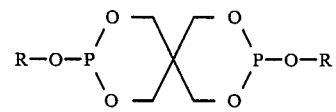

and

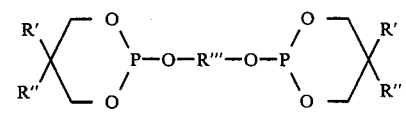

in which R-R″ are aliphatic $C_1-C_{20}$ radicals and R‴ are alkylene, cycloalkylene or alkylene-arylene radicals containing from 2 to 20 carbon atoms, and thiodipropionic acid esters. To obtain a satisfactory effect, this combination has to be used in large doses of up to 7% by weight, based on the fibers, which cannot be regarded as safe, particularly in the case of articles of clothing. In addition, this method of stabilization no longer satisfies current requirements and even leads to accelerated browning in the event of exposure to UV light.

Less elaborate and more efficient is the stabilization proposed in US-PS 3 573 251 using antioxidants corresponding to the following formula

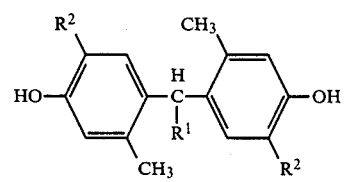

or

-continued

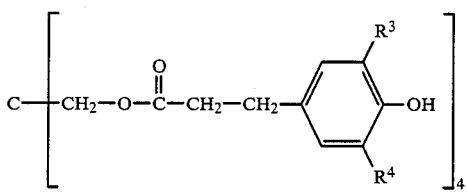

in which $R^1$ to $R^4$ are largely alkyl groups and phosphites corresponding to the following formula

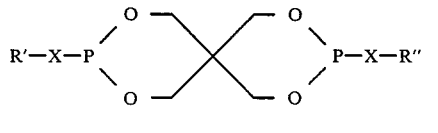

or

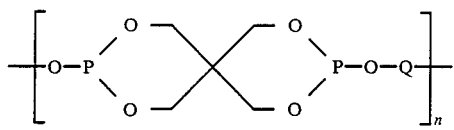

in which X represents O or S, R' and R" are alkyl groups, Q represents

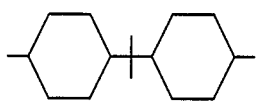

and n represents a molecular weight of at least 1000.

However, as shown in EP-A 137 408, this stabilization is surpassed by the condensation of aryl-alkyl-phosphites essentially containing the following structural element

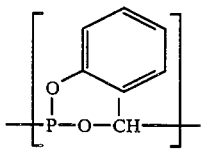

and antioxidants obtained by alkylation of p-cresol with dicyclopentadiene and isobutylene or highly alkylated phenolic antioxidants corresponding to formula I.

The comparison tests in EP-A 137 408 with phosphites having the structure of pentaerythritol (Weston 618) and the above antioxidants clearly show poorer results than the aryl-alkylphosphites of phenol and secondary alcohols which are claimed in EP-A 137 408.

It has now surprisingly been found that stabilizer combinations of antioxidants (a) corresponding to formula I and reaction products (b) of aliphatic and aromatic monophosphites with pentaerythritol and perhydrobisphenol A are superior to the combinations according to EP-A 137 408.

On the basis of the tests published in EP-A 137 408, phosphites having pentaerythritol structures could not be expected to represent equivalent or superior combinations.

The present invention relates to elasthane filaments and fibers containing a phenolic antioxidant and a phosphite stabilizer, characterized in that, in the stabilizer mixture, (a) the phenolic antioxidant corresponds to the following formula

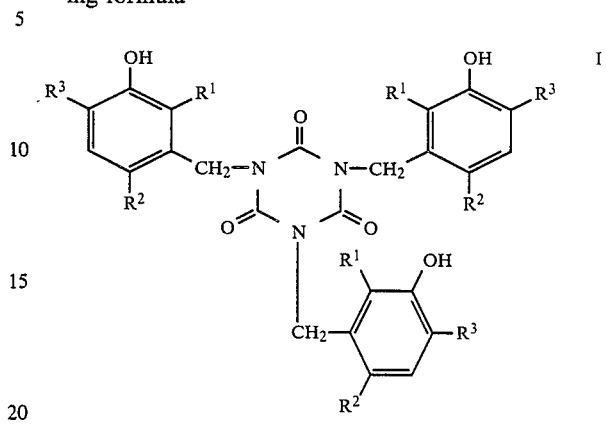

in which
$R^1$, $R^2$ and $R^3$ are $C_1$-$C_3$ alkyl radicals, in addition to which $R^3$ may represent $C_4$-$C_6$ alkyl radicals
and
(b) the phosphite stabilizers are oligomeric, (cyclo)aliphatic phosphorous acid esters obtained by reaction of pentaerythritol, perhydrobisphenol A with monomeric trialkyl or triaryl phosphites, optionally in the presence of a monoalcohol.

Suitable antioxidants corresponding to formula I are those in which $R^1$, $R^2$ and $R^3$ are $C_1$-$C_3$ alkyl radicals, in addition to which $R^3$ may represent $C_4$-$C_6$ alkyl radicals. Preferred antioxidants corresponding to formula I are those in which $R^1$ and $R^2$ represent methyl and $R^3$ represents methyl, ethyl, isopropyl, cyclohexyl; compounds of formula I, in which $R^1$ and $R^2$ represent methyl and $R^3$ represents tert.-butyl are particularly preferred antioxidants of which the following are examples:

2,4,6-tris(2,4,6-trimethyl-3-hydroxybenzyl)-isocyanurate,
2,4,6-tris-(4-ethyl-2,6-dimethyl-3-hydroxybenzyl)-isocyanurate,
2,4,6-tris-(4-isopropyl-2,6-dimethyl-3-hydroxybenzyl)-isocyanurate,
2,4,6-tris(4-cyclohexyl-2,6-dimethyl-3-hydroxybenzyl)-isocyanurate, but especially
2,4,6-tris-(4-tert.-butyl-2,6-dimethyl-4-hydroxybenzyl)-isocyanurate.

Suitable reaction products of aromatic and aliphatic monophosphites with pentaerythritol and perhydrobisphenol A are obtained by esterifying the components trialkyl or triphenylphosphite, pentaerythritol, perhydrobisphenol A and, optionally, a monoalcohol with one another in the necessary molar ratios and, at the same time, removing the alcohol (from the trialkylphosphite) or the phenol (from the triphenylphosphite) from the equilibrium by distillation, optionally in vacuo, up to a sump temperature of at most 200° C.

Pentaerythritol is best first reacted with the phosphite with removal by distillation of a first fraction of approximately 2 moles hydroxy compound per mole phosphite, after which perhydrobisphenol A is added and more hydroxy compound is distilled off during the reaction to a sump temperature of preferably 180° C. and more preferably 170° C.

If it is intended to co-use a $C_6$-$C_{18}$ monoalcohol, it is preferably added after the second fraction of the hydroxy compound has been distilled off. After addition of this monoalcohol, a third fraction of the hydroxy compound is removed from the phosphite originally used by distillation, optionally in vacuo, to a sump temperature of preferably 180° C. and more preferably 170° C.

Vacuum has to be applied in particular when triphenyl-phosphite is used or when the final traces of a lower alcohol are to be removed from the reaction mixture in the final stage of the transesterification reaction.

The components mentioned above are reacted with one another in the following molar ratios:

| Components | In general | Molar ratios Better | Preferred | Particularly preferred |
|---|---|---|---|---|
| Perhydrobisphenol A | 1 | 1 | 1 | 1 |
| Pentaerythritol | 0.5–2.0 | 0.66–1.5 | 0.75–1.3 | 0.80–1.2 |
| Phosphite | 1.3–4.0 | 1.5–3.5 | 1.6–3.2 | 1.7–2.8 |
| Monoalcohol | 0–1.5 | 0–1.0 | | 0–0.3 |

Suitable phosphites are triphenylphosphite and trialkylphosphites of $C_1$-$C_4$ alcohols, trimethyl and triethylphosphite being particularly preferred.

Suitable monoalcohols are aliphatic $C_6$-$C_{18}$ alcohols, especially primary alcohols. Iso-octanol, decanol, dodecanol, tetradecanol and octadecanol are mentioned as examples.

Naturally, this synthesis by transesterification does not produce uniform compounds, but instead mixtures of oligomeric phosphites which predominantly have the following structure:

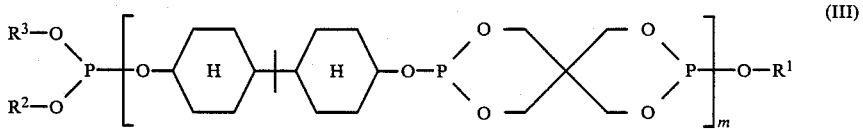

(III)

in which
R¹, R² and R³ may be the same or different and represent $C_1$-$C_{18}$ alkyl, aryl, a radical corresponding to formula IV

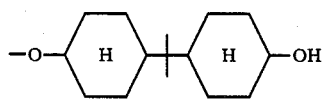

IV in addition to which R¹ may represent a radical corresponding to the following formula

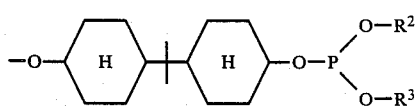

V

R² and R³ together may represent a radical corresponding to the following formula

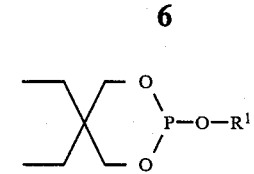

VI and m is an integer of from 1 to 20.

Preferably, R¹, R² and R³ are methyl, ethyl, propyl, butyl, isooctyl, decyl, dodecyl, tetradecyl, octadecyl, in addition to which R¹ may represent the radicals IV and V and R² and R³ together may represent the radical VI, m=2 to 15.

Particularly preferred meanings for R¹, R² and R³ are methyl, ethyl, octadecyl (stearyl), in addition to which R¹ may represent the radicals IV and V and R² and R³ together may represent the radical VI, m=2 to 10. Compounds such as these may also be prepared, for example, in accordance with US-A 3 053 878.

The concentration of the phosphite stabilizer may be between 0.5 and 10% by weight, based on the fiber material. The preferred phosphite concentration is normally in the range from 1 to 5% and more preferably in the range from 1 to 3%. The concentration of the phenolic antioxidant required to obtain the synergistic effect may be in the range from 0.2 to 5% by weight and preferably in the range from 0.5 to 2% by weight, based on the fiber material. Preferred combinations are those in which the concentrations of the phenolic antioxidants (a) make up from about 15 to 70% by weight and preferably from 16.6 to 50% by weight of the synergistic stabilizer combination.

The combination according to the invention of stabilizing compounds may be added to the polyurea polyurethane solution during the synthesis although it is better added on completion of the synthesis.

The polyurea polyurethanes are prepared by known methods. It has proved to be particularly effective to synthesize the fiber raw materials by the prepolymer process in the first stage of which a long-chain diol is reacted with a diisocyanate in a solvent or in the melt to form a prepolymer in such a way that the reaction product contains terminal isocyanate groups.

Preferred diols are, on the one hand, polyester diols and, on the other hand, polyether diols. Mixtures of polyester and polyether diols may also be used. The diols generally have a molecular weight of from 1000 to 6000.

Suitable polyester diols are, for example, dicarboxylic acid polyesters which may contain both several alcohols and also several carboxylic acids. Particularly suitable are mixed polyesters of adipic acid, hexanediol and neopentyl glycol in a molar ratio of 1:0.7:0.43. The polyesters preferably have a molecular weight of from 1000 to 4000.

Suitable polyether diols are, for example, polytetramethylene oxide diols, preferably with molecular weights of from 1000 to 3000.

Mixtures of polyester or polyether diols with diols containing tertiary amino groups may also be used.

In the synthesis of the elasthane raw materials, the usual aromatic diisocyanates are used optionally in admixture with small amounts of aliphatic diisocyanates. Particularly useful results are obtained with the following diisocyanates: 2,4-tolylene diisocyanate and corresponding isomer mixtures, more especially 4,4'-diphenylmethane diisocyanate and corresponding isomer mixtures with small amounts of 2,4'- and/or 2,2'-isomers. Mixtures of aromatic diisocyanates may of course be used. Other suitable mixture components are, for example, the following (cyclo)aliphatic diisocyanates: hexamethylene diisocyanate, isophorone diisocyanate, dicyclohexylmethane diisocyanate or trans-1,4-cyclohexane diisocyanate.

In another particularly favorable embodiment of the synthesis of elasthane raw materials according to the invention, polyester and polyether polyurethane prepolymers are mixed and then reacted in known manner to form polyurea polyurethanes. The most favorable mixing ratio of polyester and polyether diols for the particular technical application envisaged may readily be determined by preliminary tests.

In the synthesis of the polyurea polyurethanes, the desired urea groups are introduced into the macromolecules by a chain-extending reaction. The macrodiisocyanates synthesized in the prepolymer stage are normally reacted in solution with diamines, for example ethylenediamine, 1,2-propylenediamine, tetramethylenediamine, 1,3-cyclohexanediamine, isophoronediamine and mixtures of these diamines, more especially mixtures containing ethylenediamine as the principal component.

The desired molecular weight may be adjusted by using a small quantity of monoamines, for example diethylamine or dibutylamine, during the chain-extending reaction.

The chain-extending reaction itself may be carried out in the presence of $CO_2$ as retarding agent.

It is also possible to mix polyester and polyether polyurethane ureas on completion of the elasthane synthesis.

In addition to the synergistic mixture of phenolic antioxidant and phosphite staabilizer described above, the elasthane fibers according to the invention may also contain a number of other additives which may serve a variety of purposes, including for example further antioxidants, light stabilizers, toning dyes, pigments, dye additives, antistatic agents, abhesive additives, such as magnesium, calcium, lithium, zinc and/or aluminium stearates, etc., providing these additives do not show an antagonistic effect with the stabilizer combination according to the invention, which may be determined by simple tests.

PREPARATION OF THE PHOSPHOROUS ACID ESTERS

EXAMPLE 1

Preparation of stabilizer A 36.6 g (0.27 mole) pentaerythritol and 89.6 g (0.54 mole) triethylphosphite were reacted with one another, 44 g ethanol distilling off through a column under normal pressure up to a sump temperature of 170° C. 72 g (0.3 mole) perhydrobisphenol A were then added and another 20 g ethanol were distilled off up to a sump temperature of 170° C. 130 g of a colorless brittle resin were obtained.

EXAMPLE 2

Preparation of stabilizer B (comparison)

A mixture of 272 g (2.0 moles) pentaerythritol and 1240 g (4.0 moles) triphenylphosphite were heated with stirring in vacuo. 749 g phenol were distilled off at 13 mbar up to a sump temperature of 170° C. After addition of 530 g (2.2 moles) perhydrobisphenol A, another 358 g phenol were distilled off at 1.0 mbar up to a sump temperature of 170° C. 946 g of a colorless brittle resin were obtained.

EXAMPLE 3

Stabilizer C 27.7 g (0.2 mole) pentaerythritol and 66.4 g (0.4 mole) triethylphosphite were reacted as described above, 31 g ethanol distilling off. After addition of 48 g (0.2 mole) perhydrobisphenol A, another 20 g ethanol and, after addition of 2.78 g (0.01 mole) stearyl alcohol, a further 3 g ethanol were distilled off. 91 g of a colorless resin were obtained.

EXAMPLE 4

Stabilizer D

Prepared as in Example 3 from 0.2 mole per hydrobisphenol, 0.01 mole stearyl alcohol, 0.2 mole pentaerythritol and 0.4 mole triethylphosphite.

EXAMPLE 5

5.1: Preparation of the stabilized elasthanes 10 kg of a polytetramethylene ether glycol (molecular weight 2000, OH value 56) were diluted with 3.07 kg dimethyl acetamide. 2.27 kg diphenylmethane diisocyanate were added to the mixture kept at 25° C., followed by reaction for 60 to 90 minutes at 50° to 55° C. until the NCO content of the prepolymer had a value of 2.65% (based on solids).

220 g ethylenediamine and 23 g diethylamine as chain terminator were dissolved in 37.2 kg dimethyl acetamide, the resulting solution introduced into a vessel and 250 g solid $CO_2$ added so that a carbamate suspension was formed. 15.3 kg of the prepolymer solution were added to this suspension with vigorous stirring. A homogeneous, clear colorless elastomer solution having a solids content of 22% by weight and a solution viscosity of 70 Pa.s was obtained. The inherent viscosity of the polymer was 1.2 dl/g (5 g/l dimethyl acetamide at 30° C.).

5.2: Stabilization according to the invention and comparisons

4% by weight titanium dioxide, 0.3% Mg stearate, 1% of the silicone oil Baysilon M 100 (Bayer AG) and 5% of a dye additive prepared by reaction of N-tert.-pentyl diisopropanolamine with dicyclohexylmethane diisocyanate in a ratio of 1:0.98 were added to the viscous polymer solution 5.1 (percentages by weight based on polyurethane solids).

The solution was divided into 4 equal parts to which the stabilizer combinations described below were added. Example 5 represents the combination according to the invention while Examples 6 to 8 are Comparison Examples:

| | |
|---|---|
| Example 5 | 1% Cyanox ® 1790 (according to the invention) |
| | 1% stabilizer B |
| Example 6 | 1% Wingstay ® L (Comparison) |

|  |  |
|---|---|
|  | 1% Weston DHOP |
| Example 7 | 1% Wingstay ® L (Comparison) |
|  | 1% stabilizer B |
| Example 8 | 1% Cyanox ® 1790 (Comparison) |
|  | 1% Weston DHOP |

Weston ® DHOP = decaphenyl heptakis (dipropylene glycol) octaphosphite
Wingstay ® L = condensate of p-cresol, dicyclopentadiene and isobutene
Cyanox ® 1790 = 2,4,6-tris-(2,6-dimethyl)-4-t-butyl-3-hydroxybenzyl)-isocyanurate
Stabilizer B = see Example 2.

The solutions prepared in accordance with the Examples were dry-spun in the usual way to form a multifil filament having an overall denier of 160 dtex.

The filaments were then made up into a circular knit test fabric and tested for stability to harmful gases.

The tests comprise on the one hand testing for fastness to nitric oxide in accordance with DIN 45 025 (characterized in Table 1 as 1×NO for gentle stressing and as 3×NO for heavy stressing) and, on the other hand, testing for fastness to nitric oxide at elevated temperatures.

In accordance with the ISO Standard 105-G02, the test specimens were fastened to a rotatable stand and introduced into a chamber heated to 60° C. into which a mixture of $NO_2$ gas and air is sprayed by means of an injection syringe in such a quantity that an $NO_2$ concentration of 600 ppm was established in the chamber.

The test specimens were then moved in this harmful gas atmosphere for 90 minutes by rotation of the stand (50 r.p.m.). They were then removed, freed from adhering $NO_2$ by washing with a 1.3% urea solution and dried in air. The results of this test are identified in the Tables by "$NO_2$ at 60°".

The particular change in color of the gassed test specimens in relation to the starting material was evaluated on the outside on the grey scale according to DIN 54 001, the FIG. 5 corresponding to hardly any change in color and the FIG. 1 to a strong change in color.

The figures in square brackets indicate the order of the evaluation from: 1=best to 4=worst test specimens.

TABLE 1:

| Example | Resistance to harmful gases | | |
|---|---|---|---|
|  | 1 × NO | 3 × NO | $NO_2$ at 60° |
| 5 according to the invention | 4 (−5) [1] | 3–4 [1] | 2 (−3) [1] |
| 6 comparison | 4 [2] | 3 (−4) [3] | 1–2 [3] |
| 7 comparison | 4 [2] | 3–4 [1] | 1 (−2) [4] |
| 8 comparison | 3–4 [4] | 3 [4] | 2 (−3) [1] |

EXAMPLES 9 TO 14

(AA)

A hydroxyl-terminated polyester having an average molecular weight of 2000 and an OH value of 56 was prepared by reaction of 10 kg adipic acid with 8.1 kg hexanediol and 7.1 kg neopentyl glycol.

(BB)

10 kg of the polyester according to (AA), 190 g methyl aza-2,6-heptanediol, 2.6 kg 4,4-diphenylmethane diisocyanate and 3.2 kg dimethyl acetamide were heated with stirring for 100 minutes to 50°–54° C. until the NCO content of the prepolymer was 2.66% by weight (based on solids). 245 g ethylenediamine were dissolved in 43.45 kg dimethyl acetamide, the resulting solution introduced into a vessel and 270 g solid $CO_2$ added so that a carbamate suspension was formed. 16 kg of the prepolymer solution were added to this suspension with intensive stirring. A homogeneous clear elastomer solution having a solids content of 22% by weight and a solution viscosity of 92.6 Pa.s was obtained. 4% by weight titanium dioxide, 0.3% by weight Mg stearate and 1% of the silicone oil Baysilon M 100 (Bayer AG) were added to the viscous polymer solution (percentages by weight based on PU solids). The solution was divided into 6 equal parts to which the following stabilizer combinations were added:

| Example 9 | 1% Cyanox 1790 (formula I) (according to the invention) 2% stabilizer A (see Example 1) |
|---|---|

EXAMPLES 10 TO 14

Comparison tests

| Example 10 | 1% Cyanox 1790 |
|---|---|
|  | 2% Weston DHOP |
| Example 11 | 1% Cyanox 1790 |
|  | 2% Weston 618 = distearyl pentaerythritol diphosphite |
| Example 12 | 1% Cyanox 1790 |
|  | 2% Irgafos 168 = tris(2,4-di-t-butylphenyl) phosphite |
| Example 13 | 1% Cyanox 1790 |
|  | 2% Sandostab PEPQ = tetrakis(2,4-di-t-butyl phenyl)-4,4'-biphenylene diphosphonite |
| Example 14 | 1% Cyanox 1790 |
|  | 2% Ultranox 626 = bis(2,4-di-t-butylphenyl) pentaerythritol diphosphite |

The solutions prepared in accordance with the Examples were spun in the usual way to form a multifil filament having an overall denier of 160 dtex.

The filaments were then made up into a circular knit fabric which was subjected to acidic brightening. Acidic brightening is a typical aftertreatment step to which blends of elasthane and polyamide are subjected.

The acidic brightening was carried out in the usual way using a liquor adjusted to pH 5 containing 1.8% by weight of an anionic brightener and 3 g/l Na dithionite. The fabric was introduced into the liquor at 40° C., the liquor was heated to 90° C. and then kept at that temperature for 60 minutes. The fabric was then removed, warm- and cold-rinsed and dried at 70° C.

The fabrics were then subjected to the harmful gas tests according to DIN 45 025 and to the test described in Examples 5 to 8. Fastness to light was also tested by the Fade-o-meter test.

TABLE 2

| Example | Stability to light and harmful gases | | | |
|---|---|---|---|---|
|  | Fastness to light | 1 × NO | 3 × NO | $NO_2$ at 60° |
| 9 according to the invention | 2 [1] | 4–5 [1] | 4–5 [1] | 2–3 [1] |
| 10 comparison | 1–2 [6] | 4–5 [1] | 1 (−5) [2] | 1 [2] |
| 11 comparison | 1–2 [3] | 4–5 [1] | 4 [3] | 1–2 [3] |
| 12 comparison | 1–2 [5] | 4 (−5) [5] | (3−) 4 [4] | 1–2 [3] |
| 13 comparison | 1–2 [3] | 4 [6] | 3–4 [6] | 1–2 [3] |
| 14 comparison | 2 [2] | 4–5 [1] | (3−) 4 [4] | 1–2 [3] |

Fastness to light was evaluated after 29 standard Fade-o-meter hours.

The figures in square brackets indicate the order of the evaluation from: 1=best to 6=worst test specimen.

The changes in color after treatment with NO were evaluated in the same way as described in Examples 5 to 8.

I claim:

1. Elasthane filaments or fibers comprising at least 85%, by weight, segmented polyurea polyurethanes of aromatic diisocyanates containing a phenolic antioxidant and a phosphite stabilizer, in which:

(a) the phenolic antioxidant corresponds to the following formula

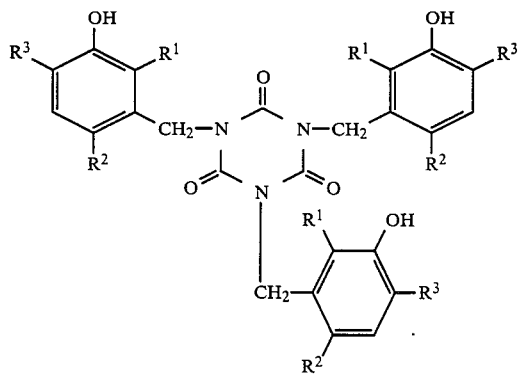

in which $R^1$, $R^2$ and $R^3$ are each independently $C_1$–$C_3$ alkyl radicals, in addition to which $R^3$ may represent $C_4$–$C_6$ alkyl radicals and (b) the phosphite stabilizer is an oligomeric, (cyclo)aliphatic phosphorous acid ester obtained by reaction of pentaerythritol and perhydrobisphenol A with a monomeric trialkyl or triarylphosphite, optionally in the presence of monoalcohol.

2. Elasthane filaments or fibers as claimed in claim 1, in which, in formula I, $R^1$ and $R^2$ are $CH_3$ or $C_2H_5$, $R^3$ represents $CH_3$, $C_2H_5$, $C_3H_7$ or $C_4H_9$ and, to prepare the phosphites, the components pentaerythritol, perhydrobisphenol A, monophosphite and monoalcohol are reacted in a molar ratio of 0.75–1.3 to 1.0 to 1.6–3.2 to 0–0.5.

3. Fibers or filaments as claimed in claim 1, in which the concentration of the phenolic antioxidants (a) in the stabilizer mixture is from 15 to 70% by weight.

4. Fibers or filaments as claimed in claim 3, in which the said concentration is from 16.6 to 50% by weight.

5. Fibers or filaments as claimed in claim 1, in which the concentration of the phenolic antioxidant, based on the fiber material, is from 0.5 to 2% by weight.

6. Fibers or filaments as claimed in claim 1, in which the concentration of the phosphite stabilizer, based on the fiber material, is from 1 to 3% by weight.

7. Fibers or filaments as claimed in claim 1, in which the elasthane is based on polyester diols.

8. Fibers or filaments as claimed in claim 1, in which the elasthane is based on polyether diols.

9. Fibers or filaments as claimed in claim 1, in which the elasthane is based on a mixture of polyester and polyether diols.

* * * * *